(12) United States Patent
Choe et al.

(10) Patent No.: US 8,185,740 B2
(45) Date of Patent: May 22, 2012

(54) CONSUMER COMPUTER HEALTH VALIDATION

(75) Inventors: Calvin Choon-Hwan Choe, Redmond, WA (US); Paul G. Mayfield, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1091 days.

(21) Appl. No.: 11/728,608

(22) Filed: Mar. 26, 2007

(65) Prior Publication Data

US 2008/0244724 A1 Oct. 2, 2008

(51) Int. Cl.
 H04L 9/32 (2006.01)
(52) U.S. Cl. ............... 713/175; 713/156; 726/5; 726/14
(58) Field of Classification Search .................. 709/225; 713/156, 175; 726/5, 14
See application file for complete search history.

(56) References Cited

U.S. PATENT DOCUMENTS

| | | | |
|---|---|---|---|
| 6,460,141 B1 * | 10/2002 | Olden | 726/4 |
| 6,834,341 B1 * | 12/2004 | Bahl et al. | 713/156 |
| 7,533,407 B2 * | 5/2009 | Lewis et al. | 726/6 |
| 2002/0002443 A1 | 1/2002 | Ames et al. | |
| 2002/0093915 A1 * | 7/2002 | Larson | 370/235 |
| 2004/0107360 A1 * | 6/2004 | Herrmann et al. | 713/201 |
| 2004/0158627 A1 | 8/2004 | Thornton | |
| 2005/0021733 A1 | 1/2005 | Clinton et al. | |
| 2005/0283457 A1 | 12/2005 | Sonkin et al. | |
| 2006/0004772 A1 | 1/2006 | Hagan et al. | |
| 2006/0047826 A1 | 3/2006 | Cromer et al. | |
| 2006/0085850 A1 | 4/2006 | Mayfield et al. | |
| 2006/0109977 A1 | 5/2006 | Grannan et al. | |
| 2006/0250968 A1 | 11/2006 | Hudis et al. | |

OTHER PUBLICATIONS

Mainwaring et al., "Wireless Sensor Networks for Habitat Monitoring", WSNA, Sep. 28, 2002, pp. 88-97.
Luo et al., "URSA: Ubiquitous and Robust Access Control for Mobile Ad Hoc Networks", IEEE/ACM Transactions on Networking, Dec. 2004, vol. 12, No. 6, pp. 1049-1063.
Teo et al., "Dynamic and Risk-Aware Network Access Management", SACMAT, Jun. 2003, pp. 217-230.

* cited by examiner

*Primary Examiner* — Eleni Shiferaw
*Assistant Examiner* — Paul Callahan
(74) *Attorney, Agent, or Firm* — Wolf, Greenfield & Sacks, P.C.

(57) ABSTRACT

Consumer computers that are not properly configured for safe access to a web service are protected from damage by controlling access to web services based on the health of the client computer. A client health web service receives health information from the client computer, determines the health status of the consumer computer, and issues a token to the consumer computer indicating its health status. The consumer computer can provide this token to other web services, which in turn may provide access to the consumer computer based on the health status indicated in the token. The client health web service may be operated as a web service specifically to determine the health of consumer computers or may have other functions, including providing access to the Internet. Also, the health information may be proxied to another device, such as a gateway device, that manages interactions with the client health web service.

19 Claims, 5 Drawing Sheets

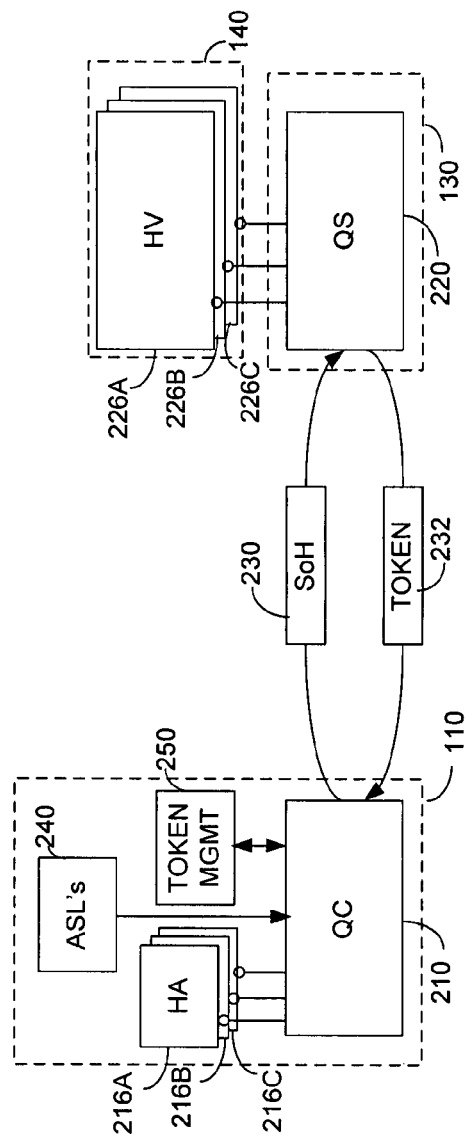
FIG. 2
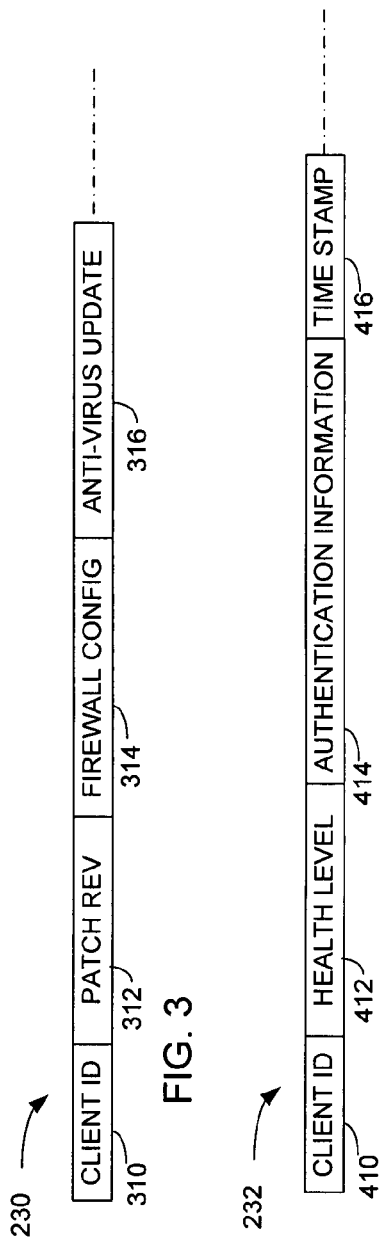
FIG. 3
FIG. 4

CONSUMER COMPUTER HEALTH VALIDATION

BACKGROUND

Network access control systems, such as NETWORK ACCESS PROTECTION™ supplied by Microsoft Corporation of Redmond, Wash., USA, are used in enterprise networks in which network access policies may be prescribed by a network administrator. Such systems include agents on network clients that collect "health" information about the clients. This health information is provided to a health validation server that can compare the health of the client to a network access policy and determine whether the client computer is healthy enough to be given network access.

"Health" information indicates whether the client computer is configured with protective software or hardware that adequately reduces the risk that the client computer will spread viruses on the network or otherwise create a security risk. For example, health information may indicate whether the client computer has antivirus software or the most recent updates to virus definition files for that software that has been installed. As other examples, the health information may include an indication of whether software patches that remedy security vulnerabilities have been installed or an indication of the type or operational status of a firewall or anti-spyware software in use by the client computer.

This health information is provided to a health validation server that can compare the health of the client to a network access policy and determine whether the client computer should be given network access.

Because enterprise networks include access control mechanisms, if access is denied for health reasons, that denial can be enforced by the access control mechanism. When access is denied, the client computer may be precluded from accessing the network entirely. Though, in other settings, when a client computer does not have a health that qualifies it for network access according to an access policy specified by the network administrator, the client computer may be "quarantined." When quarantined, the client computer is allowed limited network access so that it can download software or patches and "remediate" itself to be in compliance with any network access control policies.

SUMMARY OF INVENTION

An access control system is provided in a consumer networking setting. The access control system can protect consumer computers by precluding them from accessing web services that they are not configured to safely access. To facilitate use with consumer computers, the access control system is implemented without centralized control functions.

In some embodiments, the access control system is implemented using a client health web service. A client computer may provide health information to the client health web service and receive in return a health token identifying the client's health status. As the client computer accesses other web services, it can provide the health token to those web services. Those web services may deny or restrict access to the client computer based on its health status as reflected in the health token.

The client health web service may be a self-contained web service or may access a second web service that analyzes the health information and determines a health status of the client computer. The client health web service may be provided specifically to process client health information or may be incorporated into a service that performs other functions. For example, a gateway device may receive health information from a client computer as the client computer seeks access to a network through the gateway device. The gateway device may use the health information to obtain a health status token, which it may either pass to the client computer or hold and act as a proxy for the client computer to provide the token to web services requesting health status information concerning the client. In other embodiments, the gateway device may retain the token and supply it to other web services when those web services challenge the health of the client computer.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 2 is a software block diagram of a client computer and a server implementing a client health web service;

FIG. 3 is a sketch of a data structure holding a statement of health;

FIG. 4 is a sketch of a data structure holding a health token;

DETAILED DESCRIPTION

We have appreciated that an access control system in a consumer network can reduce the security risks to client computers and/or web services on the network, even though there is no centralized administrator that specifies or enforces a network access policy. The access control system may be voluntarily used by consumers operating client computers and one or more web service operators. The access control system allows web services to protect themselves from receiving data from "unhealthy" clients that are at risk of spreading viruses or otherwise present security risks. Further, the access control system protects client computers from operating in unsafe conditions, such as a condition in which they are at risk of using virus infected files or operating their firewalls with security vulnerabilities.

One or more web services may act as client health web services that can receive health information from client computers and determine a health status of the client based on that information. This determination may be made by the client health web services alone or in combination with a health validation service provider. Once made, the determination can be reflected in a token. This token can then be provided to other web services as an indication of the health status of the client, without the need for those other web services to collect and validate health information.

The client health web services may be specifically implemented for their role in receiving and validating health information. However, any web service may act as a client health web service and receive health information and validate it. In some instances, though, it may be undesirable for a client to provide health information to un-trusted web services.

Accordingly, the system may provide an ability to restrict the web services to which the client computer provides health information and/or a health token.

Figure 1:
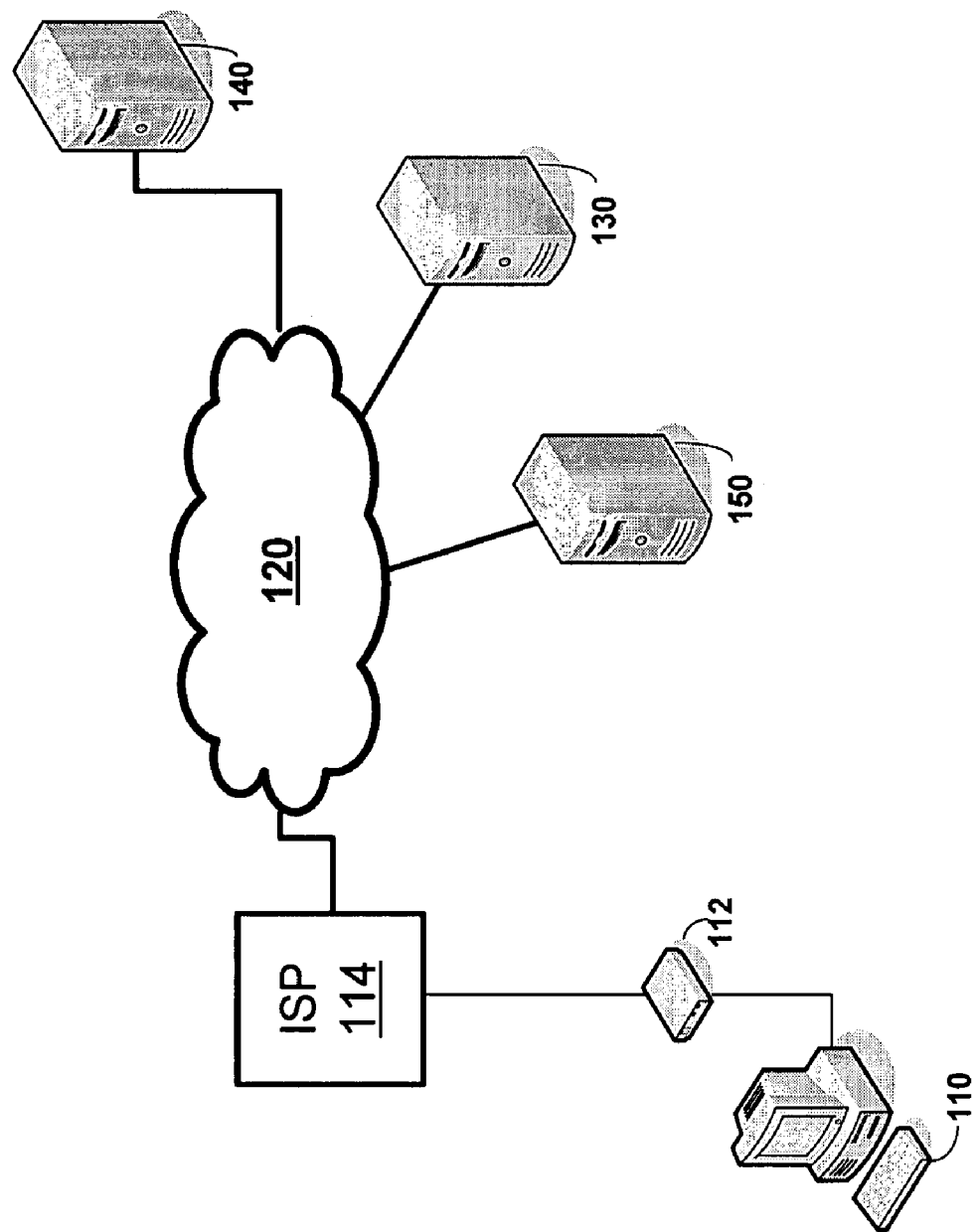
FIG. 1 is a sketch of a consumer network in which the invention may be employed.

FIG. 1 is a sketch of a consumer network in which an access control system according to embodiments of the invention may be employed. FIG. 1 shows a client computer 110 accessing a network, here shown as Internet 120, through an Internet service provider 114. The invention may be employed in conjunction with any suitable method of accessing a network. However, in the embodiment illustrated in FIG. 1, client computer accesses Internet service provider 114 through a gateway device, illustrated as modem 112.

Internet service provider 114 may be a cable company, in which case modem 112 may be a cable modem. Alternatively, Internet service provider 114 may be a telephone company offering DSL services, in which case modem 112 may be a DSL modem. However, the specific technology used by Internet service provider 114 is not a limitation on the invention and any suitable technology may be used for providing access to a network.

A consumer operating client computer 112 may use Internet access provided by Internet service provider 114 to access one or more web services. Web service 150 is an example of a web service that may be accessed by client computer 110

Web service 150 may be implemented on a server or other suitable hardware device or devices connected to Internet 120. A web service may simply be a website providing information to a user, such as a website advertising a store or a business. However, web services can be more complex than a simple passive website. Some websites are interactive, allowing users to upload and download information. For example, many businesses operate interactive websites through which users may place orders for goods or services. Though, even more complex web services are available, such as those that allow a user to invoke functions executed on a server. For example, many banks provide online banking web services through which a user may invoke functions such a transferring money between accounts or electronically paying bills. Though, many types of web services are currently available in a consumer network and many more are likely to be developed in the future. Accordingly, the invention is not limited by the specific types of web services accessed by a consumer using client computer 110.

However, before interacting with client computer 110, web service 150 may validate that client computer 110 is sufficiently "healthy." Because interactions with a web service may involve the exchange of data or even executable programs, interactions with an unhealthy client computer could pose a risk to either the web service or the client computer. For example, the consumer operating client computer 110 could be unaware that the antivirus software on client computer 110 is out-of-date or that a firewall on client computer 110 is misconfigured or turned off. Interacting with a web service in this state may result in client 110 becoming infected from a virus in information downloaded from web service 150 or otherwise being exposed to security risks. Conversely, if client computer 110 has out-of-date antivirus software or a misconfigured firewall, client computer 110 may spread a virus to web service 150 by uploading a virus infected data file or may allow unauthorized users to gain access to web service 150 through client computer 110.

Accordingly, the network of FIG. 1 contains client health web service 130 and health validation service provider 140 that may be used in combination with software within client computer 110 and web service 150 to implement an access control system.

Client health web service 130 is shown here implemented in a server connected to Internet 120. However, the specific hardware used to implement client health web service 130 is not a limitation on the invention and any suitable hardware device or devices may be used. Likewise, health validation service provider 140 is shown implemented in a separate server connected to Internet 120. However, any suitable device or devices may be programmed to implement health validation service provider 140. Though in the embodiment of FIG. 1, client health web service 130, health validation service provider 140 and web service 150 are shown implemented in separate devices, the invention is not limited by the hardware used to implement the web services. One or more of the client health web service 130, health validation service provider 140 and web service 150 may be implemented in a single device or group of devices.

To facilitate access control, client health web service 130 receives health information from client computer 110. Client health web service 130 uses the health information to determine the health status of client computer 110. To allow this health status information to be communicated to other web services, client health web service 130 issues a token indicating the health status of client computer 110. The token may be encoded to identify its origin so that any other web service that trusts client health web service 130 may rely on the token as providing an accurate indication of the health status of client computer 110.

In the example illustrated, client health web service 130 may provide a token to client computer 110. As client computer 110 attempts to access web service 150, client computer 110 may provide the token to web service 150. Web service 150 may then validate that client computer 110 is sufficiently healthy to interact with web service 150 based on health status information in the token. Conversely, if client 110 is not healthy, web service 150 may deny or limit the services it allows client computer 110 to access. As a result, access control may be implemented through web service 150 even though web service 150 neither received health information directly from client computer 110 nor evaluated the status of client computer 110 based on its current health information.

Thus web services may be modified easily to form a portion of the access control system. Ease of implementation as well as added protection from unsafe client computers provides an incentive for businesses operating web services for consumers to participate voluntarily in the access control system. Moreover, because client computer 110 is also protected by the access control system, consumers operating client computers are also motivated to participate in the access control system by incorporating software that provides health information to client health web service 130 and a token to web service 150.

In the embodiment illustrated, client health web service 130 collects health information from client computer 110 and generates a token. In these rolls, client health web service 130 is a trusted web service, being trusted both by client computer 110 before it provides health information and by web service 150, which relies on the token generated by client health web service 130. In the embodiment illustrated, client health web service 130 may be hosted by a bank, major retailer or other widely known and trusted party. To simplify implementation of a client health web service 130 and encourage such trusted parties to host such web services, FIG. 1 shows that client health web services 130 does not, itself, process health information to determine health status.

In the embodiment illustrated, the processing to determine health status is performed by health validation service provider 140. Health validation service provider 140 may manage the information necessary to determine health status from health information. For example, health validation service provider 140 may track updates to all commercially available antivirus software and can therefore determine, based on health on information identifying a date of update of the antivirus software in client computer 110, whether client computer 110 has up to date antivirus software. Because health validation service provider 140 has the burden of tracking developments in protective technology, such as antivirus or anti-spyware software, the burden of implementing a client health web service is reduced by determining health status in a separate device. However, other architectures may be employed in which analysis of client health information is performed by client health web service 130 or in other suitable ways.

FIG. 2 shows an example software architecture of an access control system according to an embodiment of the invention.

FIG. 2 shows a client computer 110, a client health web service 130 and a health validation service provider 150. These components may be connected through a consumer network, allowing those components to exchange data as packets or formatted in any other suitable way.

In the architecture of FIG. 2, client 110 is equipped with a quarantine client component 210. Quarantine client component 210 is a software component configured to operate when client computer 110 attempts to gain access to a web service, such as web service 150 (FIG. 1). In the embodiment illustrated, quarantine client component 210 performs functions associated with gathering and providing health information to a client health web service.

In the embodiment illustrated in FIG. 2, quarantine client component 210 obtains information about the health of client computer 110 from one or more health agents, of which health agents 216A, 216B and 216C are illustrated. Each health agent is a further software component adapted to obtain health information about a protective component of client computer 110. The health agents may be provided by vendors that provide protective components for client computer 110. For example, a vendor of antivirus software may provide a health agent that provides information about the configuration of the antivirus software installed on client computer 110. That information may identify both the version of antivirus software and the date of the most recent update of the data files used by that software. Other health agents may provide information about anti-spyware software, software firewall or other protective components.

In the embodiment illustrated, each health agent 216A, 216B and 216C has a standardized interface allowing quarantine client component 210 to query all health agents to obtain health information. In some embodiments, the health the agents 216A, 216B and 216C may be the same health agents that are used in client computers to implement network access control systems in enterprise networks. However, any suitable mechanism for obtaining health information may be employed.

Quarantine client component 210 may format the health information into a statement of health 230 that is transmitted to client health web service 130. The specific format in which the health information is transmitted is not a limitation on the invention and any suitable format may be used. However, an example of the format of a statement of health is provided in FIG. 3, as described below.

The times at which statement of health 230 is transmitted by quarantine client component 210 may be dictated by the intended operation of the access control system. In some embodiments, quarantine client component 210 may collect health information from health agents 216A, 216B and 216C and transmit statement of health 230 in response to a challenge from client health web service 130. In other embodiments, a statement of health 230 may be formed and transmitted as part of client computer 110 requesting access to a web service that restricts access based on the health status of a client computer.

In some embodiments, quarantine client component 210 will selectively provide health information such that only client health web services that are trusted receive the health information. Any suitable method may be used to identify trusted client health web services. In the embodiment illustrated, client computer 110 may be programmed with an authorized service list 240. Authorized service list 240 may contain a list of client health web services authorized to receive a statement of health 230 from client 110. When an authorized service list 240 is present, quarantine client component 210 transmits a statement of health 230 only as part of an interaction with a client health web service on the authorized service list 240. However, any suitable method of identifying a trusted client health web service may be used, such as obtaining a certificate issued by a trusted source from the client health web service. Regardless of the method used to identify a trusted client health web service, quarantine component 210 may be configured to transmit health information only to a trusted web service.

Client health web service 130 may include a quarantine server component 220 that processes statement of health 230 received from client 110. In the embodiment illustrated, quarantine server component 220 accesses one or more health verifiers, of which health verifier 226A, 226B and 226C are shown. In the example of FIG. 2, health verifiers 226, 226B and 226C are maintained by a health validation service provider 140 and quarantine server component 220 accesses health verifiers over a network or through any suitable interface.

In the embodiment illustrated, each of the health verifiers 226A, 226B and 226C processes a specific type of health information that may be included in statement of health 230. As a specific example, each health verifier may process information generated by a health agent such as health agents 216A, 216B and 216C. Separate health verifiers may be provided to verify information about antivirus software, a firewall configuration or other protective components. As with health agents 216A, 216B and 216C, health verifiers may be provided by vendors of protective software or hardware for a client computer 110 and accessed through a standardized interface. In this way, health validation service provider 140 may readily be maintained to process health information generated by any client computer.

In the embodiment illustrated, three health agents 216A, 216B and 216C and three health verifiers 226A, 226B and 226C are shown. The number and types of health agents and health verifiers is not a limitation on the invention. Further, it is not necessary that health validation service provider 140 contain the same number of health verifiers as a client computer 110 contains health agents. In some embodiments, a client computer will contain only a subset of the total available protective software and other components. Accordingly, a client computer may contain only a subset of the total available health agents. In contrast, a health validation service provider 140 may contain health verifiers to process information from any of a number of client computers which may be configured with any of a number of different types of protective software or other components. Accordingly, health validation service provider 140 may contain more health verifiers than there are health agents in a client 110.

In some embodiments, the health verifiers 226A, 226B and 226C may be the same health verifiers that are used in servers that implement network access control systems in enterprise networks. However, any suitable mechanism for analyzing health information may be employed.

Regardless of the specific mechanism used to analyze health information, quarantine server component 220 determines a health status of client 110 by processing information in statement of health 230. The health status indicates conclusions about the health of client computer 110 drawn from information in statement of health 230. The conclusions about the health of client computer 110 may be presented in any suitable form, which may contain one or more values in any suitable form.

For example, the conclusions may be binary, indicating that client computer 110 is or is not up-to-date with antivirus software or is or is not up-to-date with software patches that could affect the security of client computer 110.

In other embodiments, health status information may be multi-valued. For example, status information may have one of multiple values defining a level of health associated with one or more parameters of protective components on client computer 110. For example, one health level may indicate that all protective software is up to date. Other values may indicate that all critical components are up-to-date, but some non-critical components are not up-to-date or not functioning. Other, lower levels may indicate that one or more critical components are out-of-date or not functioning.

Regardless of the specific mechanism used to represent the health status of client computer 110, quarantine service component 220 may form the token 232 to include that information. Quarantine server component 220 may also include in token 232 other information useful for using for administering token 232. For example, in some embodiments, token 232 may contain information identifying client 110 or information identifying when token 232 was generated. Further, quarantine server component 220 may insert authentication information into token 232, which may allow web services or other components receiving token 232 to determine the origin of token 232 and/or to determine whether token 232 was generated by a trusted source.

Regardless of the specific configuration of token 232, quarantine server component 220 may provide token 232 to quarantine client component 210. Within client computer 110, quarantine client computer 210 may provide token 232 to a token management component 250. Token management component 250 may store token 232 for later provision to a web service to which client computer 110 seeks access. In addition, token management component 250 may monitor and delete tokens that are out-of-date.

A simple mechanism that may be employed by token management component 250 to identify out-of-date components is to compare a time stamp associated with the generation of the token with the current time. Token management component 250 may delete tokens that were generated more than a predetermined amount of time in the past. In that scenario, token management component 250 may then signal quarantine client component 210 to request another token from client health web service 130.

However, any suitable mechanism may be used to identify out-of-date tokens. For example, token management component 250 may monitor outputs of health agents 216A, 216B and 216C to identify any changes in health information provided by those agents. Token management component 250 may delete previously-stored tokens at any time health information changes. Though, the invention is not limited to the foregoing examples of token management functions and token management component 250 may perform any suitable functions.

Regardless of the specific token management functions performed, client computer 110 may have available to it a token for use whenever a user or application executing on client computer 110 indicates that client computer 110 should access a web service for which a health token is required to gain access. When access is required, quarantine client component 210 may provide a token indicating the health status of client computer 110 to a web service, such as web service 150 (FIG. 1).

In embodiments in which authorized service list 240 identifies web services that are authorized to receive a token containing the health status of client 110, quarantine client component 210 may consult authorized service list 240 before providing a token. Services authorized to receive a token with health status may be preprogrammed in authorized service list 240 or identified in any other suitable way, including by receipt of a certificate or other information from the service. Regardless of how the services authorized to receive a token are identified, quarantine client 210 may be configured to transmit a token only a part of a interaction with a service that is authorized to receive the token.

The specific format in which health information in statement of health 230 is stored or transmitted is not critical to the invention. However, FIG. 3 provides an example of information that may be contained in statement of health 230. In the example illustrated, the information may be stored in one or more tangible computer-readable media or may be transmitted as part of a packet over a computer network.

In the example of FIG. 3, statement of health 230 includes a field 310 identifying client computer 110. Any suitable mechanism may be used to identify client computer, including a MAC address, a computer name, IP address or other suitable identifier. The information in client identifier field 310 may be used to return a token generated from statement of health 230 to the appropriate client computer. Additionally, the information contained in client identifier field 310 may be incorporated into a token so that when the token is used it may be associated with the client computer 110 for which it was generated.

In addition, statement of health 230 may contain one or more fields containing health information about one or more types of protective software or other components. In the example of FIG. 3, three fields 312, 314 and 316 are shown. However, any suitable number of fields may be used. In this example, field 312 contains information identifying the revision level of the most recent patches applied to the operating system of client computer 110. Such information may be generated by a health agent associated with the operating system of the computer.

Field 314 may contain health information identifying a configuration of a firewall computer 110. Such information may be generated by a health agent associated with the firewall. Similarly, field 316 may contain information identifying the most recent update to the antivirus data files in use by antivirus software within client computer 110. The information in field 316 may likewise be generated by a health agent associated with the antivirus software in use on client computer 110. If other protective software or components are in use within computer 110, statement of health 230 may contain other fields conveying information about that protective software or those components.

FIG. 4 shows an example of a token 232 that may be returned by client web service 130. As with statement of health 230 (FIG. 3), the information depicted in FIG. 4 may be stored in a computer-readable medium or transmitted over a network as part of a packet or other datagram. In this example, token 232 contains a field for identifying client computer 110. The information in field 410 may be derived from the information in client identification field 310 within statement of health 230 or derived in any other suitable way.

Token 232 contains a field 412 conveying the health level associated with client computer 110. As described above, the value stored in health level field 412 may be generated by quarantine server component 220 based on information provided by health verifiers 226A, 226B and 226C. However, the health level value stored in field 412 may be generated by quarantine server component 220 or any other component in any suitable way.

In the embodiment illustrated, token 232 contains a field 414 containing authentication information. The information stored in field 414 may be inserted by quarantine server component 220 to identify the client health web service that generated token 232. As token 232 is provided to other web services, those services may use authentication information in field 414 to determine whether token 232 was generated by a trusted client health web service.

Authentication information in field 414 may take any suitable form. In some embodiments, field 414 may simply contain an identification code associated with the client health web service that generated token 232. However, multiple approaches for authenticating information in a packet transmitted over a network are known and may be used in conjunction with a token 232. For example, mechanisms are known to sign messages digitally in a way that authenticates the source of the message and ensures its integrity. Digital signatures may be used alone or in combination with techniques designed to encrypt network messages to ensure their confidentiality. Accordingly, depending on the level of authentication, integrity and confidentiality desired for token 232, token 232 may contain one or more types of information used to provide authentication, integrity or confidentiality of the data conveyed by token 232. For example, token 232 could be formatted as an X.509 certificate, which would allow any web service receiving the token to validate with a trusted third party that the token was generated by a certified client health web service 130. In the schematic illustration provided in FIG. 4, any or all information used for authentication, integrity or confidentiality associated with token 232 is represented by field 414. However, one of skill in the art will appreciate that such information may be stored in one of multiple formats. Though a single field is illustrated in FIG. 4, the information may be stored in multiple fields or combined with or embedded in information in other fields.

Token 232 is also shown to contain a time stamp field 416. In the embodiment illustrated, quarantine server component 220 inserts a value in time stamp field 416 when it generates token 232. The time stamp information allows client computer 110 or any other web service receiving token 232 to determine whether the token is based on recent information about the health of client computer 110. Because the state of client computer 110 may change, recipients of token 232 may use the information in time stamp field 416 to determine whether token 232 was generated based on information that is sufficiently recent to rely on the health level depicted in field 412.

In the embodiment illustrated, the value in time stamp field 416 is inserted by quarantine server component 220. However, in other embodiments, the value in time stamp field 416 may be inserted by a component in client computer 110 after receipt of token 232 from client health web service 130. Thus, FIG. 4 should be viewed as an example of the types of information that may be available in connection with a token 232, but not a limitation on the manner in which that information is generated.

In this context, a "token" is a collection of related information that is provided from one device to another. The token may have a form as shown in FIG. 4, but the specific form is not a limitation on the invention. For example, as noted above, a token may be formatted as a X.509 certificate. As another example, token 232 could be implemented as a web browser "cookie," though other suitable forms are also possible.

Figure 5:
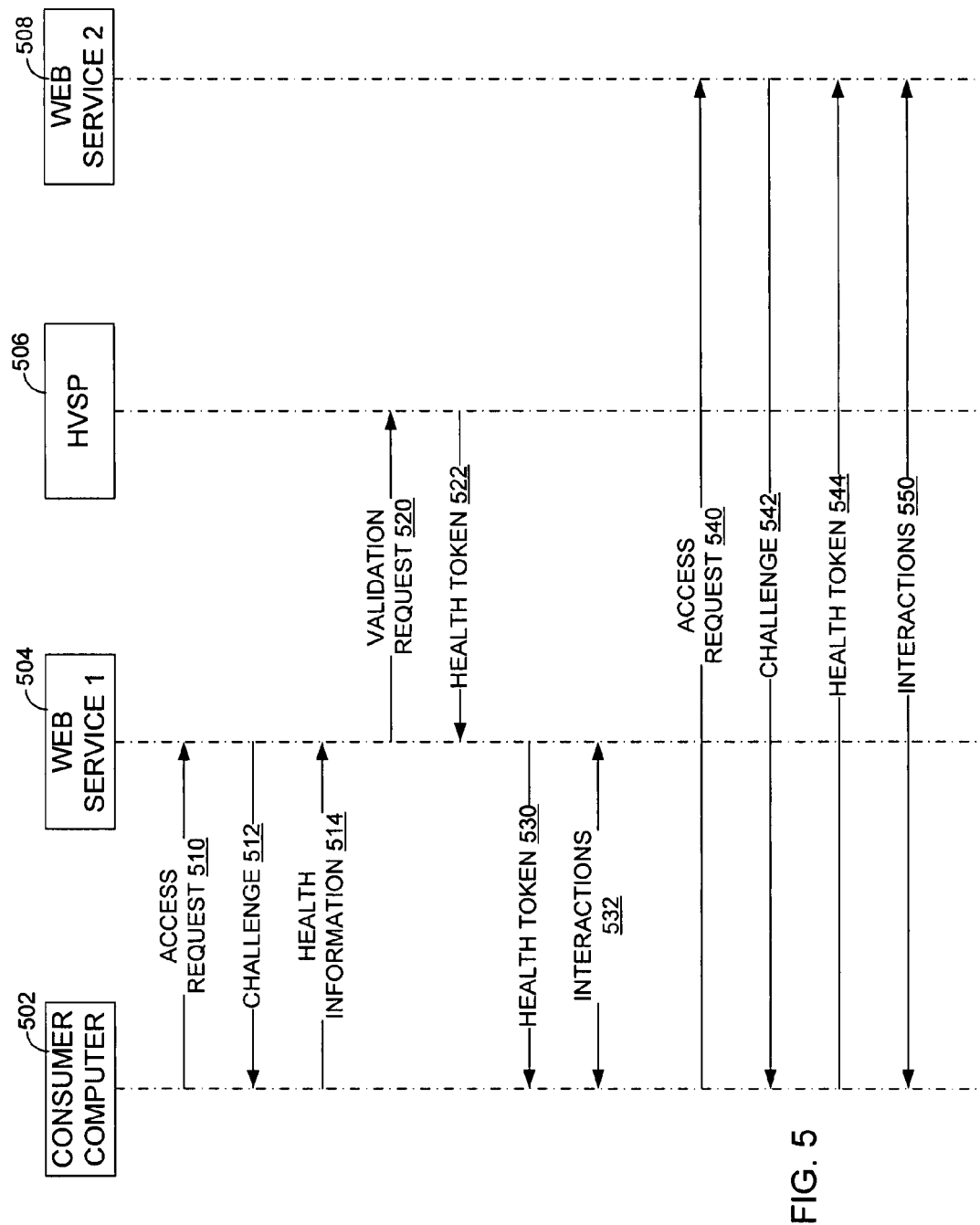
FIG. 5 is a message flow diagram in an access control system according to an embodiment of the invention.

FIG. 5 shows a message flow diagram useful in understanding interactions among components forming an access control system for a consumer network, such as the Internet. In the example of FIG. 5, consumer computer 502 communicates with a web service 504 and a web service 508. Such interactions may occur, for example, with a consumer computer connected to the Internet when its user browses the web and accesses different web services. In FIG. 5, and message flow diagrams of FIGS. 6A and 6B, each arrow may represent information conveyed over a network as a packet. For example, each of the messages depicted in FIG. 5 may be communicated as a TCP/IP packet. However, the exact method by which each event is implemented is not a limitation on the invention. Each event may represent any type of datagram or an interaction in any other suitable form.

In the example of FIG. 5, web service 504, in addition to providing a web service to the user of consumer computer 502, acts as a client health web service. A further device, here shown as health validation service provider 506, is available to web service 504 to validate the health of consumer computer 502 based on health information obtained from consumer computer 502.

The process illustrated in FIG. 5 begins with an access request 510, which may be in any suitable form. For example, access request 510 may represent an HTTP request as is conventionally used to initiate a connection between a consumer computer and a web service. However, the specific form of access request 510 is not critical to the invention.

In the embodiment illustrated, web service 504 is configured to only establish connections with consumer computers 510 that have a health level in compliance with levels set by the operator of web service 504. As a specific example, the operator of web service 504 may configure the web service to deny connections to consumer computers that do not have an active firewall or up to date antivirus software. Accordingly, in response to receiving access request 510, web service 504 issues a challenge 512.

Challenge 512 may be a message in any suitable format indicating that web service 504 will not establish a connection until consumer computer 502 demonstrates that it is sufficiently "healthy" to comply with the access control policies established by web service 504.

Consumer computer 502 responds to challenge 512 by providing health information packet 514 to web service 504. Health information packet 514 may be in the format of statement of health 230 (FIG. 3) or in any other suitable form.

In the embodiment illustrated, though web service 504 acts as a client health web service, it is not equipped on its own to validate the health information. Accordingly, web service 504 transmits a validation request 520 to health validation service provider 506. Health validation request 520 may contain the same health information as packet 514 and any other information used by health validation service provider 506 to determine the health status of consumer computer 502.

Health validation service provider 506 may process the health information conveyed in validation request 520 and generate health status information for consumer computer

502. In the embodiment illustrated, the health status information is in the form of token 232 (FIG. 4). Accordingly, the health token is conveyed from health validation service provider 506 to web service 504 in a health token packet 522.

Web service 504 may use the information in health token packet 522 to determine whether consumer computer 502 has a health level warranting access to web service 504. In the example illustrated in FIG. 5, web service 504 determines that consumer computer 502 has a health level complying with its access policy and grants access to consumer computer 502, allowing interactions 532.

In addition, web service 504 forwards the health token to consumer computer 502 in packet 530 for later use by consumer computer 502. At a later time, a user of consumer computer 502 may attempt to access web service 508. Accordingly, consumer computer 502 may generate an access request 540 to web service 508. In the embodiment illustrated, web service 508 is also configured to deny access to consumer computers that are not sufficiently "healthy." Accordingly, web service 508 issues a challenge 542 to consumer computer 502. In this example, consumer computer 502 conveys its health status to web service 508 by conveying in packet 544 the token in received from web service 504. Conveying health status through a token may be more efficient than providing raw health information for the web service to analyze. Further, providing a health token may allow consumer computer to convey health status information when the web service receiving the information is not configured as a client health web service that can receive and process health information.

In the embodiment illustrated, web service 508 relies on the health token conveyed in packet 544. Web service 508 may accept the token because web service 508 is programmed to recognize web service 504 as a trusted source of health tokens. Alternatively, the decision to accept the token may be based on certification by a third party. However, web service 508 may be configured to determine whether to accept the token in packet 544 in any suitable way.

Additionally, web service 508 may check the time stamp in the token conveyed in message 544 and compare it to a current time. Web service 508 may be programmed to allow connections only to consumer computers offering current tokens, such as those generated or predetermined prior to the current time.

In the example of FIG. 5, web service 508 determines that the health token conveyed in message 544 is current, generated by a trusted service and indicates that consumer computer 502 has a health level qualifying consumer computer 502 to access web service 508. Accordingly, web service 508 establishes a connection and interactions 550 occur between consumer computer 502 and web service 508. Interactions 550 may represent interactions as may traditionally occur between a consumer computer and a web service. Though the specific types of interactions that occur once access is granted is not a limitation on the invention.

Figure 6A:
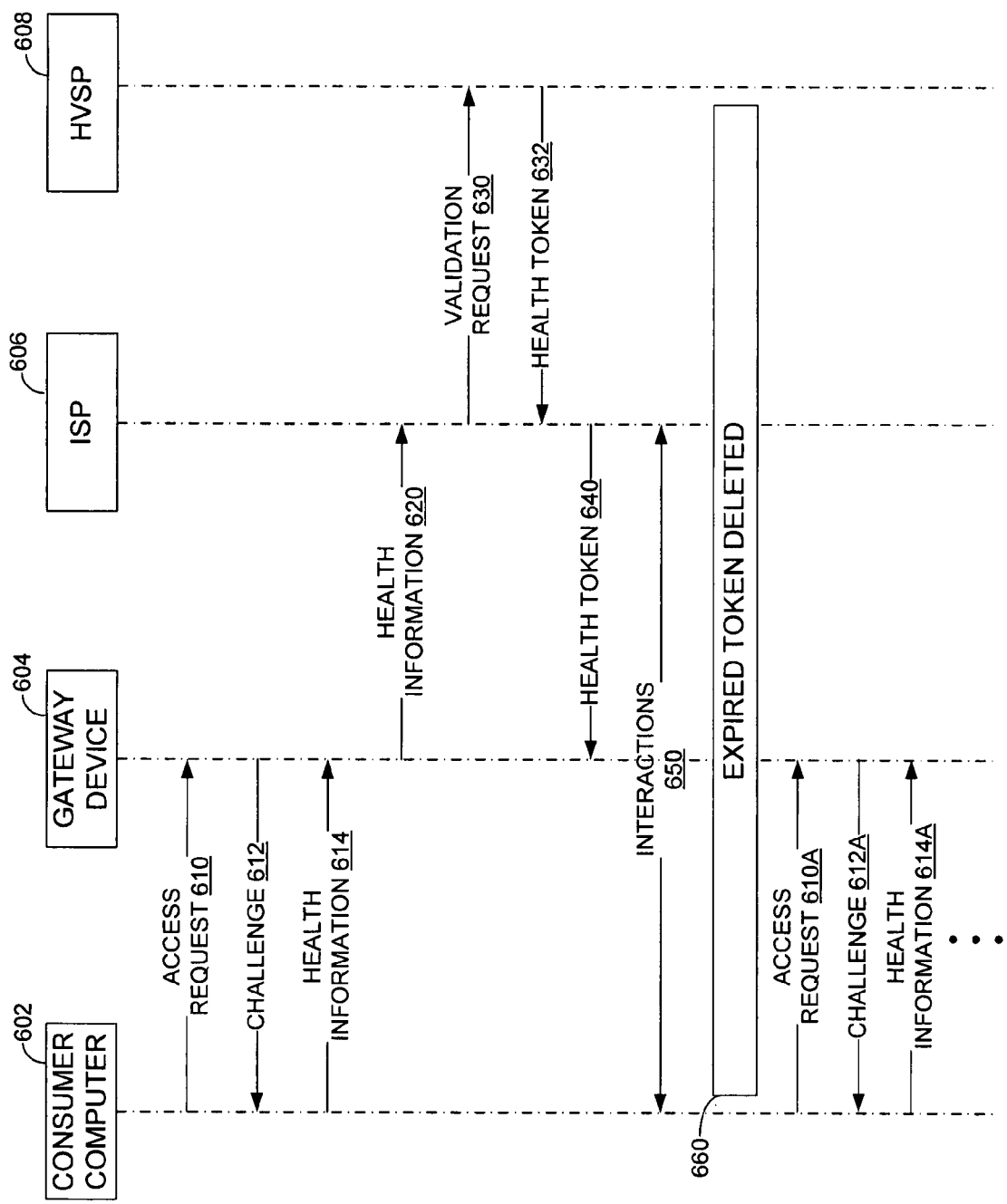
FIG. 6A is a message flow diagram in an access control system according to an alternative embodiment of the invention.

FIG. 6A shows an example of interactions that may occur between devices implementing an access control system according to an alternative embodiment of the invention. Such interactions may occur, for example, when a gateway device, such as modem 112 (FIG. 1) in combination with a device provided by Internet service provider 114 (FIG. 1) acts as a client health web service. In the example of FIG. 6A, consumer computer 602 attempts to connect to the Internet by sending an access request 610 through gateway device 604. The access request may be in any suitable form, including TCP/IP or lower level packets traditionally used for a consumer computer to gain access to the Internet through a gateway device.

Gateway device 604, in response to access request 610, issues challenge 612 notifying consumer computer 602 that access to the Internet may be restricted based on the health status of consumer computer 602.

In response to challenge 612, consumer computer 602 conveys health information in a packet 614 to gateway device 604. Health information in packet 614 may be in a format of statement of health 230 (FIG. 3) or an any other suitable form.

In the embodiment illustrated, gateway device 604 forwards the health information received from consumer computer 602 to Internet service provider 606 in a packet 620.

Internet service provider 606 in turn forwards the health information to health verification service provider 606 as part of validation request 630. In response, health validation service provider 608 processes the health information to determine a health level of consumer computer 602. This health level may be reflected in a health token communicated in packet 632 sent to Internet service provider 606.

Internet service provider 606 may forward the health token to gateway device 604 in packet 640. In this example, gateway device 604 maintains tokens for any consumer computer connected through it to Internet service provider 606. By maintaining health tokens for the consumer computers, gateway device 604 may act as a proxy for those devices, forwarding health tokens to any web service that requires health status information before granting access to a consumer computer. However, the tokens may be stored and used in any suitable manner.

Once health status information is obtained by gateway device 604 and/or Internet service provider 606 from health verification service provider 608, Internet access can be provided to consumer computer 602 in accordance with the access control policies of Internet service provider 606. Healthy consumer computers may be granted full access to the Internet by Internet service provider 606. Accordingly, interactions 650 may represent conventional Internet access interactions that occur between a consumer computer and an Internet service provider.

However, in some embodiments, when a consumer computer is deemed to have a health level insufficient to warrant full access to the Internet, Internet service provider 606 may grant limited access to consumer computer 602 so that consumer computer can remediate any deficiency in its protective software or other components. In that scenario, interactions 650 may represent an exchange of network packets associated with accessing a remediation server that can provide updated software or data for use with antivirus software or other protective software or provide instructions on how to appropriately configure a firewall or other protective component on consumer computer 602. Though, the specific interactions 650 may depend on the nature of the remediation required based on the health status of consumer computer 602, and the specific interactions 650 are not a limitation on the invention.

As described above, health tokens may have a limited lifetime and may be deleted or ignored after their lifetime expires. As described above in connection with FIG. 2, token management component 250 monitors the lifetime of tokens and deletes expired tokens. Other components may perform a similar function. For example, in an embodiment in which gateway device 604 stores tokens, gateway device 604 may be equipped with a similar token management component that deletes expired tokens.

Regardless of the specific component that identifies and deletes expired tokens, in the process of FIG. 6A, the token issued by health validation service provider 608 may expire and be deleted at step 660. Once the token for consumer computer 602 is deleted, any subsequent request for access may require provision of updated health information. Accordingly, FIG. 6A shows that following step 660 an access request 610A generates a challenge 612A. In response to the challenge, consumer computer 602 may provide again health information through packet 614A, updated for the time at which challenge 612A is generated. Thereafter, packets such as those depicted as health status information 620, validation request 630, health token packet 632 and health token packet 640 may be repeated, resulting in a decision to grant or deny access to consumer computer 602 based on its current health status information. The health token generated in response to updated health information 614A may also eventually expire. At each expiration of the token, the process of requesting access and providing health information as depicted in FIG. 6A may be repeated.

Figure 6B:
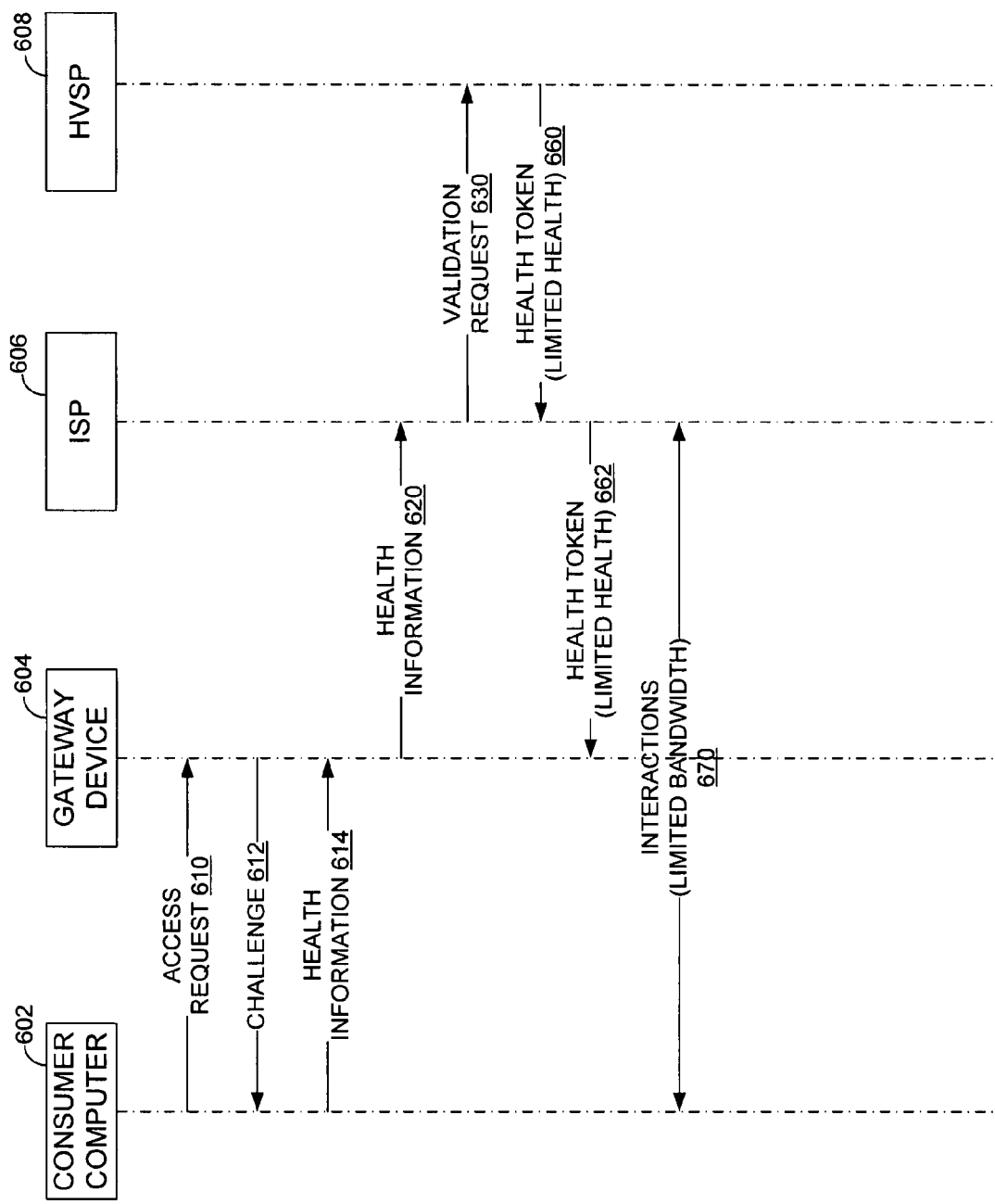
FIG. 6B is a message flow diagram in an access control system according to a further embodiment of the invention.

FIG. 6B provides a further example of messages that may be communicated among devices implementing a network access control system according to an embodiment of the invention. The devices depicted in FIG. 6B are the same as those in FIG. 6A, including consumer computer 602, gateway device 604, Internet service provider 606 and health verification service provider 608. In the example illustrated in FIG. 6B, consumer computer 602 may have a health status that does not entitle it to full access to the Internet through Internet service provider 606.

The process in FIG. 6B begins in the same fashion as the process in FIG. 6A. Accordingly, FIG. 6B shows access request 610, challenge 612, health information packet 614, health information packet 620 and validation request 630.

Upon processing the health information communicated in validation request 630, health validation service provider 608 determines that consumer computer 602 is not fully healthy, which will be reflected in the health status reported. For example, health validation service provider 608 may determine that consumer computer 602 has an improperly configured firewall, creating a risk that consumer computer 602 may be "hijacked" for use in a denial of service attack. In addition to being undesirable because of its effect on the integrity of the public Internet, such a denial of service attacks may be undesirable for Internet service provider 606 because it would consume bandwidth in its access network, thereby depriving legitimate customers of full use of the Internet.

Accordingly, Internet service provider 606 may restrict access by consumer computers that have a health status indicating that they are vulnerable for use in such attacks or vulnerable to use in other ways deemed undesirable by Internet service provider 606.

In the scenario illustrated, health validation service provider 608 may generate a health token indicating that consumer computer 602 has a limited health status. That token may be communicated in packet 660 to Internet service provider 606, which may also communicate the limited health token to gateway device 604 in packet in 662. Gateway device 604 may store the limited health token in the same way it stored a health token received in packet 640 (FIG. 6A). However, rather than simply caching the limited health token, gateway device 604 and Internet provider 606 may cooperate to limit the bandwidth with which consumer computer 602 accesses the Internet. The limited bandwidth interactions are depicted as interactions 670. By providing limited bandwidth interactions, consumer computer 602 may be able to obtain software, component updates, instructions or other information useful for remediation of consumer computer 602. However, by providing limited bandwidth, the potential for consumer computer 602 to degrade the perform of the network maintained by Internet service provider 606 is reduced.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of operating a client computer, comprising:
   accessing a first web service;
   providing a statement of health to the first web service;
   receiving a health token from the first web service;
   accessing a second web service;
   in response to a challenge from the second web service, providing the health token to the second web service; and
   configuring the client computer with information on web services authorized to receive health information about the client;
   wherein providing a statement of health to the first web service comprises selectively providing the statement of health when the first web service is authorized to receive health information about the client.

2. The method of claim 1,
   wherein providing the health token to the second web service comprises selectively providing the health token when the second web service is authorized to receive health information about the client.

3. The method of claim 1, wherein providing a statement of health comprises providing information on at least one of a firewall configuration and antivirus software on the client computer.

4. The method of claim 1, wherein receiving a health token from the first web service comprises receiving an X.509 certificate.

5. The method of claim 1, wherein receiving a health token from the first web service comprises receiving a browser cookie.

6. The method of claim 1, further comprising deleting the token from the client computer at an expiry time.

7. A method of operating a first web service, comprising:
   receiving a request for a service from a client computer;
   requesting from the client computer status information relating to the health of the client computer;
   accessing a second web service to determine a health status of the client computer based on the status information; and
   providing a health token to the client computer indicative of the health status of the client computer, wherein providing the health token comprises providing a health token indicating that the client computer does not comply with at least one of a required antivirus protection and a firewall configuration.

8. The method of claim 7, wherein the first web service and the second web service a coupled to the Internet and accessing the second web service comprises providing the status information to the second web service over the Internet.

9. The method of claim 7, wherein providing the health token comprises providing a health token identifying the client computer.

10. The method of claim 7, wherein providing the health token comprises providing a health token indicating that the client computer does not comply with at least one requirements.

11. The method of claim 10, wherein providing a health token to the client computer comprises a token with information identifying the first web service.

12. A system for controlling access to the Internet by a client computer, comprising:
    a gateway device coupled to the client computer, the gateway device being adapted and configured to connect the client computer to the Internet, and the gateway device having gateway computer-readable media having computer-executable instructions for:
      receiving health information from the client computer;
      determining a validation status of the client computer based on the health information; and
      selectively controlling access by the client computer to the Internet based on the validation status, wherein the computer-executable instructions for selectively controlling access comprise computer-executable instructions for controlling bandwidth of a connection of the client computer to a device providing a web service on the Internet based on the validation status, the connection to the device having a first bandwidth when the validation status is validated, the connection to the device having a second bandwidth when the validation status is un-validated, and the first bandwidth being greater than the second bandwidth, wherein:
      the connection having the second bandwidth enables the client computer to obtain at least one instruction to remedy health of the client computer.

13. The system of claim 12, wherein the gateway device comprises a modem.

14. The system of claim 12, further comprising an authentication server coupled to the gateway device; and
    wherein the computer-executable instructions for determining the validation status of the client computer comprise computer-executable instructions for providing the health status information to the authentication server.

15. The system of claim 14, wherein the computer-executable instructions for determining the validation status of the client computer comprise computer-executable instructions for receiving from the authentication server a health token generated based on the health status information.

16. The system of claim 15, wherein:
the health token comprises a limited health token when the health status information indicates that the client computer does not comply with at least one requirement; and
when the gateway receives the limited health token, the gateway determines that the validation status is un-validated and communicates with an Internet provider so that the connection to the device has the second bandwidth.

17. The system of claim 12, wherein the client computer comprises client computer-readable media having computer-executable instructions for:
collecting health information relating to the client; and
providing the health information to the gateway device.

18. The system of claim 17, wherein the computer-executable instructions for collecting health information comprise a plurality of health agent modules.

19. The system of claim 18, wherein the client computer comprises a consumer computer in a home.

* * * * *